(12) United States Patent
Kapanipathi et al.

(10) Patent No.: US 9,009,429 B2
(45) Date of Patent: Apr. 14, 2015

(54) DEDUPLICATION OF DATA STORED IN A COPY VOLUME

(75) Inventors: Sri Harshan Kapanipathi, Karnataka (IN); Sandeep Bangalore Harshavardhana, Karnataka (IN); Rajkumar Kannan, Karnataka (IN); Tushar Vengurlekar, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 715 days.

(21) Appl. No.: 13/260,304

(22) PCT Filed: Mar. 30, 2009

(86) PCT No.: PCT/IN2009/000206
§ 371 (c)(1),
(2), (4) Date: Sep. 24, 2011

(87) PCT Pub. No.: WO2010/113167
PCT Pub. Date: Oct. 7, 2010

(65) Prior Publication Data
US 2012/0017060 A1    Jan. 19, 2012

(51) Int. Cl.
*G06F 12/00*    (2006.01)
*G06F 13/00*    (2006.01)
*G06F 3/06*    (2006.01)
*G06F 11/14*    (2006.01)

(52) U.S. Cl.
CPC ............ *G06F 3/0689* (2013.01); *G06F 3/0608* (2013.01); *G06F 3/065* (2013.01); *G06F 11/1453* (2013.01); *G06F 2201/84* (2013.01)

(58) Field of Classification Search
CPC .................................................. G06F 3/0641
See application file for complete search history.

(56) References Cited

U.S. PATENT DOCUMENTS

| 5,978,791 | A | 11/1999 | Farber et al. | |
| 6,928,054 | B1 * | 8/2005 | Montuno et al. | 370/235 |
| 2007/0226444 | A1 * | 9/2007 | Yagawa | 711/170 |

(Continued)

FOREIGN PATENT DOCUMENTS

| CN | 1523497 | 8/2004 |
| CN | 1573753 | 2/2005 |
| EP | 2012235 | 1/2009 |
| WO | WO-2010113167 | 10/2010 |

OTHER PUBLICATIONS

John Morris, Data Structures and Algorithms, 1998, https://www.cs.auckland.ac.nz/software/AlgAnim/hash_tables.html, Section 8.3.*

(Continued)

*Primary Examiner* — Sean D Rossiter
(74) *Attorney, Agent, or Firm* — Trop, Pruner & Hu, P.C.

(57) ABSTRACT

A source volume and a copy volume are stored, where the copy volume contains data that has been modified by writes to the source volume. In response to a write to a particular location and resource volume, a deduplication data structure is checked to determine whether the copy volume contains data that is the same as data in the particular location. In response to determining from the deduplication data structure that a copy volume contains the same data as the data in the particular location, a reference to the first location of the copy volume storing the same data is added instead of repeating storing of the data of the particular location in the copy volume.

16 Claims, 7 Drawing Sheets

(56) References Cited

U.S. PATENT DOCUMENTS

| | | |
|---|---|---|
| 2007/0255758 A1 | 11/2007 | Zheng et al. |
| 2008/0005141 A1 | 1/2008 | Zheng et al. |
| 2008/0005201 A1 | 1/2008 | Ting et al. |
| 2008/0126431 A1 | 5/2008 | Walliser |
| 2008/0250085 A1* | 10/2008 | Gray et al. .................. 707/204 |
| 2009/0063795 A1* | 3/2009 | Yueh ............................ 711/162 |
| 2009/0083610 A1 | 3/2009 | Arai |
| 2009/0254507 A1 | 10/2009 | Hosoya et al. |
| 2009/0323940 A1* | 12/2009 | Moffat et al. ................. 380/44 |
| 2010/0131680 A1* | 5/2010 | Go et al. ....................... 710/26 |
| 2010/0186095 A1* | 7/2010 | Ray et al. ...................... 726/27 |
| 2011/0016152 A1* | 1/2011 | Popovski et al. ............ 707/797 |
| 2013/0325821 A1* | 12/2013 | Amit et al. ................... 707/692 |
| 2014/0201170 A1* | 7/2014 | Vijayan et al. ............... 707/692 |

OTHER PUBLICATIONS

EP OA, 09842560.6, Jun. 20, 2013, 6 pps.
EP extended search report, Application No. 09842560.6, Publication 2414940, Oct. 29, 2012, 7 pps.
International Search Report and Written Opinion, dated Aug. 23, 2010, 9 pages.

* cited by examiner

DEDUPLICATION OF DATA STORED IN A COPY VOLUME

CROSS-REFERENCE TO RELATED APPLICATION

This application is a national stage application under 35 U.S.C. §371 of PCT/IN09/00206, filed Mar. 30, 2009.

BACKGROUND

With advancement in storage technology, the amount of data that can be stored in storage subsystems, which include hard disk drives, disk array systems, and so forth, has increased dramatically. Copies of data in storage subsystems can be maintained for various purposes, including data backup, data mining (in which the data is analyzed to provide a better understanding of the data), and so forth.

There are different types of copies, including snapshots and clones. A snapshot is a point-in-time representation of data. A snapshot contains blocks of data of a source storage volume that have been changed due to one or more write operations (note that unchanged data in the source storage volume is not copied to the snapshot). In response to writes that modify data in the source storage volume, the original data is copied to the snapshot prior to writing to the source storage volume.

Another type of copy is a clone, which contains a full copy of a source storage volume, including data of the source storage volume that has not been modified.

An issue associated with maintaining snapshots and/or clones is that they can be storage space inefficient. Generally, snapshots are more space efficient than clones. However, as a snapshot ages, the storage space utilization of the snapshot also increases, which can lead to increased inefficiency in storage space usage. One reason for the inefficiency of storage space usage is that the snapshots and/or clones may contain a relatively large amount of duplicate data.

BRIEF DESCRIPTION OF THE DRAWINGS

Some embodiments of the invention are described with respect to the following figures.

DETAILED DESCRIPTION

Figure 1:
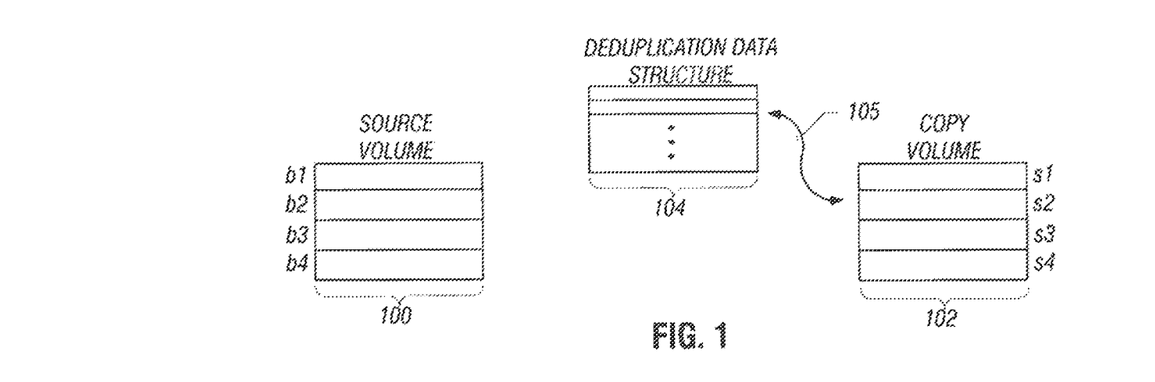
FIG. 1 is a schematic diagram of an arrangement that includes a source volume, a copy volume, and a deduplication data structure that contains information to allow for detection of duplicate data, in accordance with an embodiment.

In a storage subsystem according to an embodiment, as shown in FIG. 1, at least one copy volume 102 is maintained for a source volume 100, where the copy volume 102 contains a version of data prior to the modification by one or more write operations to the source volume. A "volume" refers to a logical unit of data that is contained in the storage subsystem. A "source volume" refers to a logical unit of data to which input/output (I/O) operations, including reads, writes, deletes, and so forth, are typically performed. A "copy volume" refers to a logical unit of data that contains a version of data stored in the source volume, where the "version" of data refers to a previous version of data (prior to modification due to a write operation) and/or to a duplicate copy of the data in the source volume. The copy volume 102 can be provided in the storage subsystem for various purposes, including data backup (to enable data recovery in case of faults, errors, or failures), data mining (to allow analysis of data to better understand the data), and/or for other purposes.

In some examples, the copy volume 102 can be a snapshot or clone. A snapshot contains blocks of data of the source volume 100 that have been changed due to one or more write operations (note that unchanged data in the source volume 100 is not copied to the snapshot). In response to writes that modify data blocks in the source volume, the original data blocks are copied to the snapshot prior to writing to the source volume.

A clone contains a full copy of the source volume 100. In addition to storing original blocks of data in the source volume 100 that have been modified by write operations, the clone also stores copies of data blocks in the source volume that have not been modified.

Although just one source volume 100 and one copy volume 102 is shown, it is noted that there can be multiple source volumes 100 and/or copy volumes 102.

As depicted in FIG. 1, the source volume 100 includes data blocks b1, b2, b3, and b4, while the copy volume 102 includes data blocks s1, s2, s3, and s4. A "data block" (or more simply "block") refers to a partition of data in a volume, where the partition is of a predefined size (or of various sizes). Although just four blocks are depicted in each of the source volume 100 and copy volume 102, it is noted that more blocks can be provided in each volume. In one example, if data block b2 in the source volume 100 is to be modified by a write operation, then the original data in data block b2 prior to the write operation completing would be copied to the corresponding data block s2 in the copy volume 102. Such copying of data from the source volume to the copy volume is performed as part of a "copy operation." The copy operation can be a copy-on-write operation or a copy-before-write operation.

In accordance with some embodiments, a deduplication data structure 104 is maintained to keep track (represented by double arrow 105 in FIG. 1) of the data that has been stored in the copy volume 102. The deduplication data structure maintains signatures that represent data blocks contained in the copy volume 102. A signature can be computed based on the content of the corresponding data block. For example, one type of a signature is a hash value (also referred to as a "hash key") that is computed by applying a hash function to the content of the data block. Another signature can be in the form of a checksum that is produced by applying a checksum function on the content of the data block, where examples of checksum functions include hash functions, fingerprints, randomization functions, and so forth. More generally, a signature is computed by applying a predefined function on content of a data block.

When a write is performed with respect to a particular data block in the source volume 100, a copy operation is initiated. As part of the copy operation, the deduplication data structure 104 is checked to determine whether the particular data block (which is being modified by the write) currently contains data that is a duplicate of data already stored in the copy volume 102. This is accomplished by calculating the signature of the data contained in the particular data block (that is to be modified) of the source volume 100, and comparing the calculated signature to the signatures in the deduplication data structure (104). If a match occurs, that is an indicator that the particular data block contains data that is a duplicate of data already present in the copy volume 102.

In this case, the storage subsystem can decide to avoid copying the data of the particular data block (that is being modified) to the copy volume 102, such that storage of multiple instances of the same data in the copy volume is avoided. Instead of copying the data of the particular data block to the copy volume, a reference is added to point to the same data already stored in the copy volume. This reference can be in the form of a pointer in metadata associated with the copy volume 102. The metadata is updated with the pointer to indicate that the original data associated with the particular data block that is being modified is stored in another location of the copy volume. This pointer can be used to recover the original data of the particular data block in case the storage subsystem has to later retrieve the original data of the particular data block.

Figure 2A:
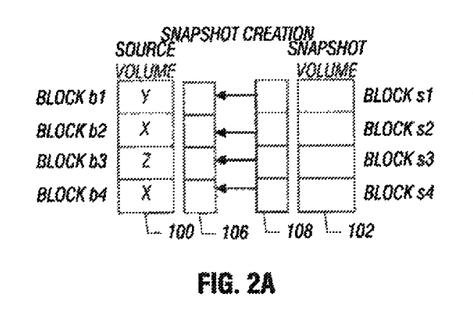
FIGS. 2A-2C illustrate an example of writes performed to a source volume that cause updates of a snapshot volume, according to an embodiment.
Figure 2B:
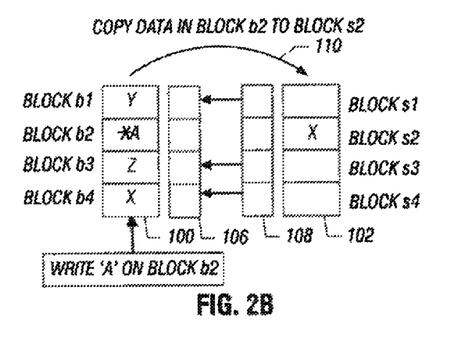
Figure 2C:
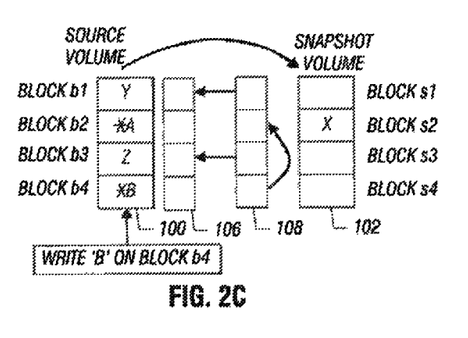

FIGS. 2A-2C illustrate an example of updates performed with respect to a snapshot volume 102 in response to writes performed with respect to the source volume 100. Although reference is made to snapshot volumes in the ensuing discussion, it is noted that the same techniques can be applied to clone volumes in other implementations.

FIG. 2A illustrates creation of the snapshot volume 102 for the source volume 100. In the source volume 100, blocks b1, b2, b3, and b4 contain respective data "Y", "X", "Z", and "X". At this point, the snapshot volume 102 is empty. The source volume 100 is associated with metadata 106, where the metadata 106 (including $m_{b1}$, $m_{b2}'$, $m_{b3}$, $m_{b4}$) describes various properties of corresponding data blocks b1, b2, b3, and b4 in the source volume 100. The properties can include size information, physical address information, and so forth. The snapshot volume 102 is also associated with corresponding metadata 108 (including $m_{s1}$, $m_{s2}$, $m_{s3}$, $m_{s4}$), which describes properties of corresponding blocks s1, s2, s3, and s4 of the snapshot volume 102. Upon initial creation of the snapshot volume 102 as shown in FIG. 2A, the metadata 108 for the snapshot volume 102 simply points to the metadata 106 for the source volume 100, since the snapshot volume 102 is empty.

FIG. 2B illustrates a write of data "A" into block b2, which causes the previous data "X" in block b2 to be replaced with "A". However, prior to completing the write of data "A" to block b2, the previous data "X" in block b2 is first copied (at 110) to block s2 in the snapshot volume 102, as shown in FIG. 2B. After copying data "X" to the snapshot volume 102, data "A" is written into block b2. Note that the metadata $m_{s2}$ for block s2 in the snapshot volume 102 no longer points to the corresponding metadata $m_{b2}$ of the source volume 100, since the metadata $m_{s2}$ for block s2 in the snapshot volume 102 now points to the data contained in snapshot block s2 (which is different from the data contained in the corresponding block b2 in the source volume 100).

Figure 3:
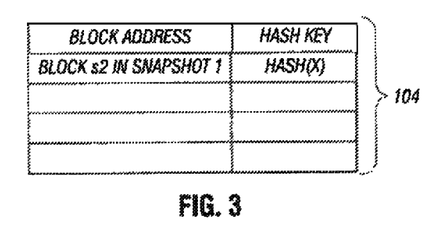
FIG. 3 illustrates a hash table according to an embodiment to allow for identification of duplicate data, according to an embodiment.

The deduplication data structure 104 used in the example of FIGS. 2A-2C is a hash table 104 shown in FIG. 3. Upon creation of the snapshot volume 102 in FIG. 2A, the hash table 104 in FIG. 3 is initially empty. However, upon writing data "A" into block b2 of the source volume 100 to replace data "X", as shown in FIG. 2B, which causes data "X" to be copied to block s2 of the snapshot volume 102, the hash table 104 is filled with an entry for data "X" that has been stored in block s2 of the snapshot volume 102. The hash table 104 of FIG. 3 has two columns: a block address column (that points to a block in the snapshot volume 102) and a hash key column (that contains the hash value that is computed based on the content of a corresponding block in the snapshot volume 102). Effectively, the hash table 104 maps hash keys to corresponding block addresses of data blocks of the snapshot volume. In the example of FIG. 3, the block address of the first entry of the hash table 104 contains an address to block s2 in the snapshot volume 102. In the hash key column, the hash value computed from data "X" (hash(X)) is stored, which constitutes the signature of data "X". The hash function, hash ( ) applied on data "X" can be an MD5 (message-digest algorithm 5) hash function, for example. In other implementations, other types of hash functions or other functions can be used.

FIG. 2C shows another write performed with respect to block b4 in source volume 100. Note that block b4 also originally contains data "X". Prior to writing "B" into block b4, it is determined if the previous data (X) in block b4 has to be copied to the snapshot volume 102. This is accomplished by computing a hash value based on data X in block b4, and comparing the computed hash value to hash values stored in the entries of the hash table 104 of FIG. 3. In the example so far, there is only one entry in the hash table 104, the entry pointing to the block s2. In this example, the computed hash value of data "X" in block b4 will match the hash value of "X" contained in the hash table 104. As a result, to avoid storing duplicate copies of data "X" in the snapshot volume 102, data "X" in block b4 is actually not physically copied to the snapshot volume 102, but instead, the metadata $m_{s4}$ for snapshot block s4 is updated by causing such metadata to point to the location of snapshot block s2, which stores a copy of "X". Such a pointer is represented by arrow 114 from metadata $m_{s4}$ to $m_{s2}$. If the content of block s4 of snapshot volume 102 later has to be retrieved, the storage subsystem will know that the actual data for snapshot block s4 is identical to data stored in snapshot block s2, based on the pointer contained in metadata $m_{s4}$, and the data for snapshot block s4 will be removed from the snapshot block s2.

Figure 4:
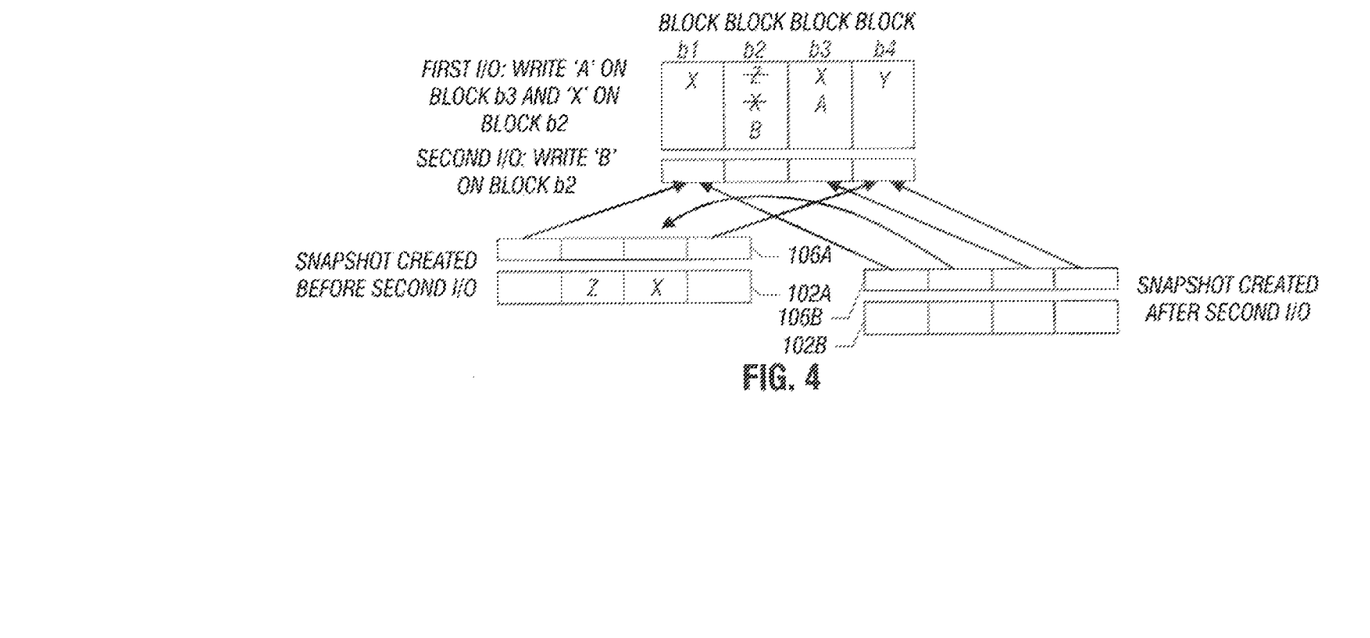
FIG. 4 illustrates another example of writes performed to a source volume that cause snapshots to be updated, according to an embodiment.

Note that FIGS. 2A-2C and FIG. 3 show an example in which there is just one snapshot volume for one source volume. It is noted that there can be multiple snapshot volumes for one source volume. If multiple snapshot volumes are created for one source volume, the deduplication structure 104, such as the hash table shown in FIG. 3, is shared by the multiple snapshot volumes. FIG. 4 shows multiple snapshot volumes 102A and 102B that are created at different points in time. Snapshot volume 102A is created prior to a second write operation to block b2 (where the second write operation occurred after a first write operation on block b2). On the other hand, the snapshot volume 102B is created after the second write operation to block b2. The multiple snapshots are created since multiple write operations have been performed with respect to the same block (in this case block b2), which means that there are multiple versions of data of a particular data block (e.g., b2).

In the example of FIG. 4, the first write operation causes data "A" to be written to block b3 in the source volume 100, and "X" to be written to block b2 in the source volume 100. The second write operation causes data "B" to be written to block b2. As a result of the first write operation, original data "Z" and "X" in blocks b2 and b3 of the source volume 100 are copied to snapshot blocks s2 and s3 of snapshot volume 102A.

When the second write is received, the storage subsystem checks to see if the first snapshot's (snapshot volume 102A) metadata for the block being written is linked to the metadata of the corresponding block of the source volume. For example, in FIG. 4, metadata $m_{s1}$ of the first source volume 102A is linked to metadata $m_{b1}$, and metadata $m_{s4}$ of the first source volume 102A is linked to metadata $m_{b4}$, since blocks b1 and b4 of the source volume 100 have not been modified. However, metadata $m_{s2}$ and $m_{s3}$ are not linked to respective metadata $m_{b2}$ and $m_{b3}$ of the first source volume 102A.

If the metadata of the corresponding block in the first snapshot volume 102A is linked to the metadata of the corresponding block in the source volume 100, then the storage subsystem initiates a copy operation for updating both the snapshots 102A and 102B with the original data in response to the write operation. The storage system calculates the hash key of the original data (that is the subject of the write operation), and then the storage subsystem checks the hash table 104 to find the hash key. If the storage system finds the hash key, then the storage subsystem updates the metadata of the first snapshot 102A and the metadata of the second snapshot volume 102B with the pointer to the data already stored in one of the snapshots. If the storage subsystem does not find a hash key in the hash table, the storage subsystem copies the old data from the source volume 100 into the free space of the first snapshot volume 102A. Next, the storage subsystem inserts the hash key and pointer to data (in the first snapshot) into the hash table. The storage subsystem then updates the metadata of the second snapshot to point to the metadata of the first snapshot for this block.

If the metadata of the block of the first snapshot volume 102A corresponding to the source block that is being written is not linked with the metadata of such source block (e.g., metadata $m_{s2}$ or $m_{s3}$) of the first snapshot volume 102A, then the storage subsystem performs a copy operation to just the second snapshot volume. The copy operation involves calculating the hash key of the original data (that is the subject of the write operation), and then the storage subsystem checks the hash table 104 to find the hash key. If the storage system finds the hash key in the hash table 104, then the storage subsystem updates the metadata of the second snapshot volume 102B with the pointer to the data already stored.

If the storage subsystem does not find the hash key in the hash table 104, then the storage subsystem copies the data into free space of the second snapshot volume 102B, and then inserts the hash key along with the pointer to data (in the second snapshot volume) in the hash table.

The same algorithm described above can be used for clones. When a clone of a source volume is created, a storage subsystem allocates space for the clone. The storage subsystem copies the metadata of the source volume to the metadata of the clone. When the storage subsystem is idle, the storage subsystem can copy the data blocks one by one and update the metadata as and when the copy happens.

Before copying data in response to a write operation, the storage subsystem first calculates the hash value of the data block, and then searches the hash table to find a match. If the storage subsystem finds such a match, then the metadata of the clone is updated to add a reference (e.g., pointer) to the duplicate data instead of copying the data to the clone. If the storage subsystem does not find the hash value in the hash table, then the storage subsystem inserts the hash value and pointer to the data block in the hash table.

Figure 5:
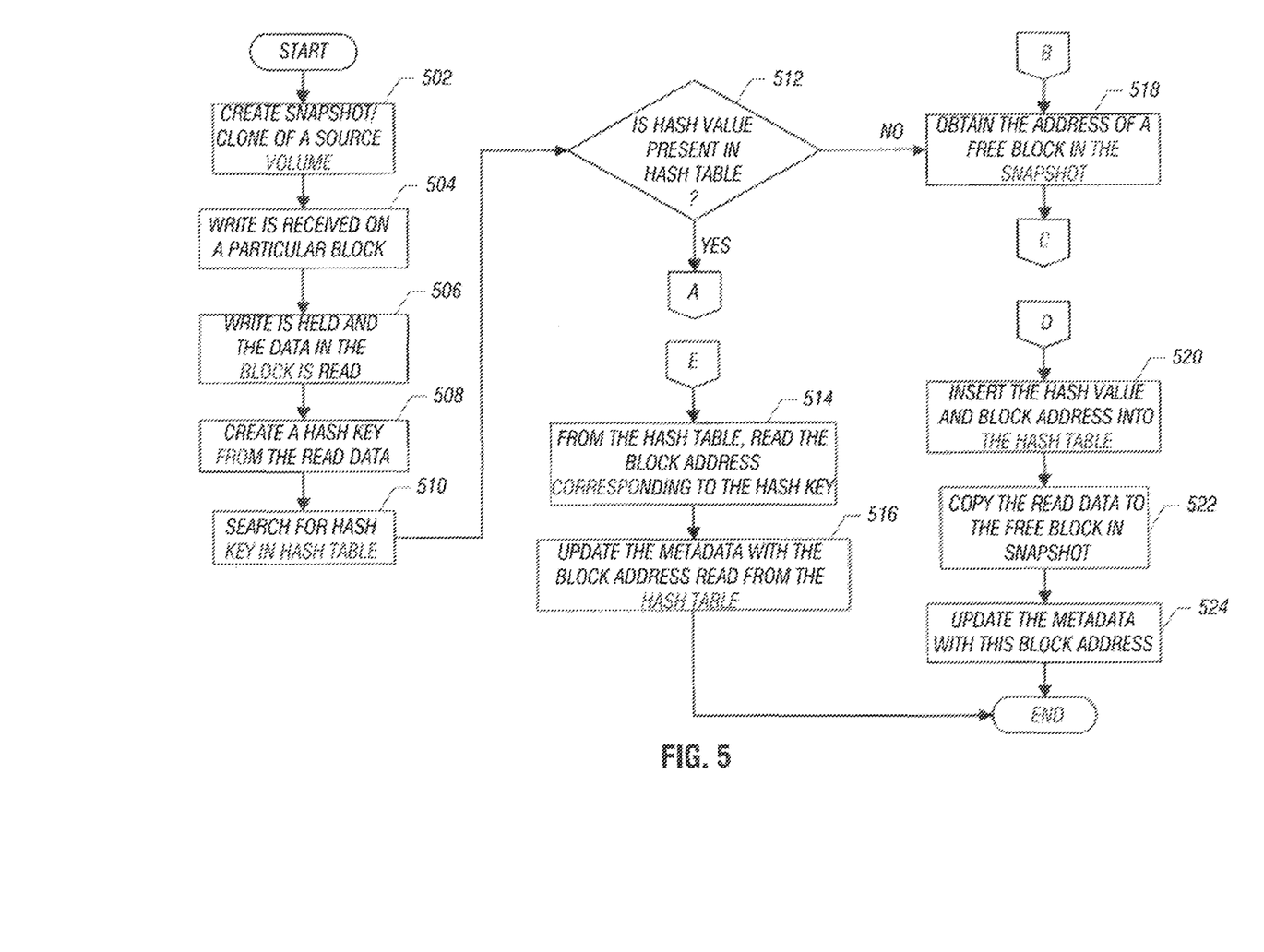
FIG. 5 is a flow diagram of a process for space efficient copying of data from a source volume to a snapshot volume, according to an embodiment.

FIG. 5 is a flow diagram of a process according to an embodiment. The process of FIG. 5 is performed by a storage subsystem that stores a source volume and that is capable of generating copy volumes (either snapshot volumes or clone volumes) for the source volume. Initially, a copy volume is created (at 502) for the source volume. Next, a write request is received (at 504), where the write request is to perform a write of data to a particular data block in the source volume. The write request is held, and the current data in the particular data block is read (at 506). The hash key based on the current data read from the particular data block is created (at 508). Next, the hash table (e.g., hash table 104 shown in FIGS. 1 and 3) is accessed and a search for a matching hash key in the hash table is conducted (at 510) to find a matching hash key for the hash key created at 508.

Next, the storage subsystem determines (at 512) whether a matching hash key was found in the hash table. If so, the storage subsystem next reads the block address corresponding to the matching hash key from the hash table (at 514). Note that in one embodiment, the process proceeds from task 512 directly to task 514 (bypassing intermediate tasks indicated by the arrows "A" and "E", which are described further below).

Instead of copying the duplicate data of the write request to the copy volume, the write data of the write request is discarded or ignored, and the metadata associated with the corresponding snapshot block is updated (at 516) with the block address that was read from the hash table.

If, on the other hand, the storage subsystem did not find (at 512) a matching hash key in the hash table for the hash key created at 508, the storage subsystem obtains (at 518) the address of a free data block in the snapshot volume. Next, the hash key of the current data (that is being modified by the write operation) and the corresponding block address in the snapshot volume are inserted (at 520) into the hash table (note that the process proceeds from task 518 to task 520, bypassing intermediate tasks indicated by arrows "C" and "D", which are described further below).

Next, the current data that was read from the particular data block of the source volume (and that is to replaced with the write data) is copied (at 522) to the free block in the snapshot volume. The metadata associated with this block of the snapshot volume is then updated (at 524).

In the discussion above, it is assumed that only one unique data block is maintained for any copy volume (in other words, multiple instances of the same data are not stored in the copy volume). However, in some other implementations, it may be desirable to store multiple instances of the same data in a snapshot volume to provide data redundancy. In this manner, if any one of the instances of the same data is corrupted, another instance of the same data can be retrieved for Use to recover the corrupted data.

In some embodiments, two types of redundancy techniques can be implemented: a low-level redundancy technique or a high-level redundancy technique.

Figure 6:
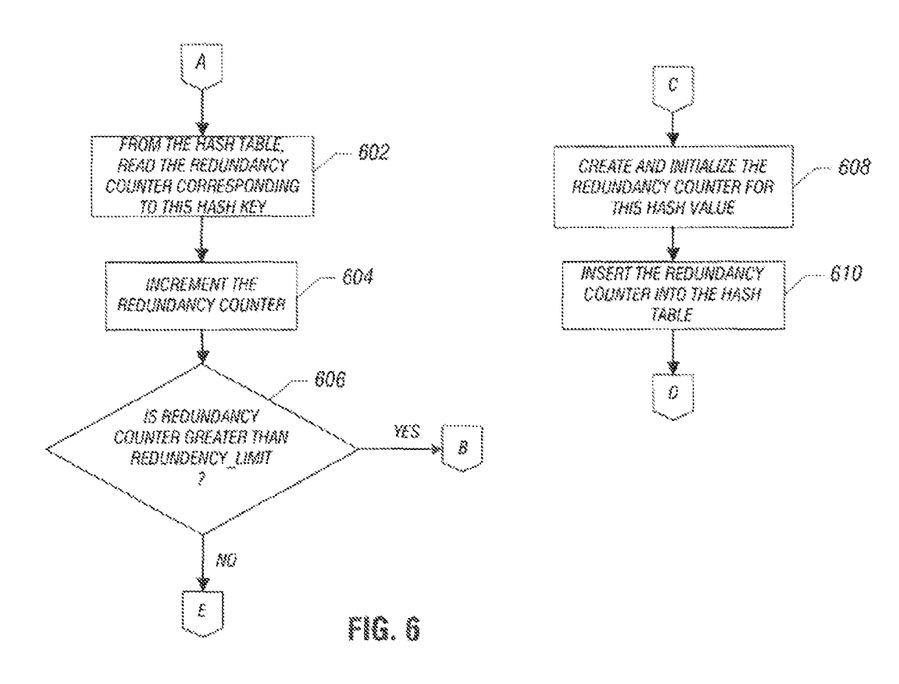
FIG. 6 is a flow diagram of additional tasks to be performed to provide data redundancy in a snapshot volume, according to an embodiment.

If the low-level redundancy technique is implemented, then additional tasks illustrated in FIG. 6 are performed in addition to those depicted in FIG. 5. Arrow "A" in FIG. 5 leads to task 602 in FIG. 6 from task 512 in FIG. 5, while arrow "C" in leads to task 608 in FIG. 6 from task 518 in FIG. 5. The remaining arrows "B", "D" and "E" shown in FIGS. 5 and 6 similarly connect to each other.

Thus, if the determination at 512 in FIG. 5 indicates that there is a hash key in the hash table matching the hash key created at 508 based on the current data in the particular data block of the source volume that is to be modified, then the storage subsystem next reads (at 602 in FIG. 6) the redundancy counter that corresponds to this hash key. In some embodiments, the redundancy counter can be maintained in the hash table, such as hash table 700 depicted in FIG. 7. The redundancy counter is a running counter that is incrementally incremented with each match to the corresponding hash key found in the hash table. If the redundancy counter reaches a threshold limit (REDUNDANCY_LIMIT), then that is an indication that another copy of the data corresponding to the same hash key should be inserted into another free block in the snapshot volume.

Figure 7:
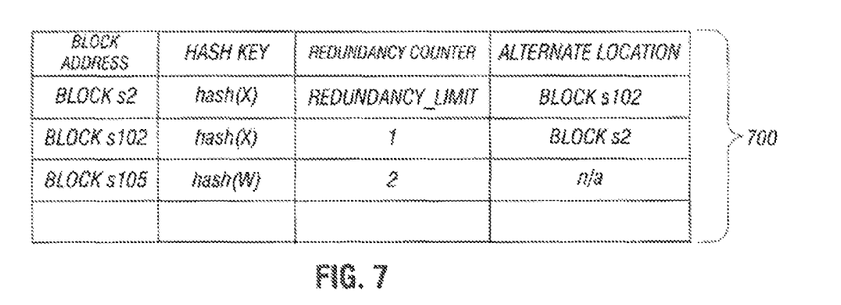
FIG. 7 illustrates a hash table according to another embodiment.

The hash table 700 of FIG. 7 includes four columns: a block address column to store the block address of the snapshot block; a hash key column to store the hash key corresponding to the data in the snapshot block identified by the block address in the block address column; a redundancy counter column containing the current value of the redundancy counter for the corresponding hash key; and an alternate location column containing the block address of an alternate block in the snapshot volume containing the same data.

Thus, in the example of FIG. 7, the first row of the hash table 700 indicates that snapshot block s102 is an alternate location that contains identical data as snapshot block s2. Similarly, the second row of the hash table 700 indicates that snapshot block s2 is the alternate location of the snapshot volume that contains duplicate data for snapshot block s102. The third row of the hash table 700 indicates that no alternate location has yet been created for snapshot block s105 (in other words, there is no duplicate data in the snapshot volume).

FIG. 7 shows that for the snapshot block s2 (represented in the first row of the hash table 700), the redundancy counter has reached the threshold REDUNDANCY_LIMIT; therefore, a duplicate copy of the same data has been created and stored in snapshot block s102. However, for the snapshot block s102 (represented in the second row of the hash table 700), the redundancy counter has a current value of 1, and thus has not yet reached REDUNDANCY_LIMIT. As a result, the next time that a match is found to snapshot block s102, another copy of the same data is not inserted into the snapshot volume; instead, only metadata is updated to point to the snapshot block that already contains the data. However, if at some later point, the redundancy counter for snapshot block s102 reaches REDUNDANCY_LIMIT, then another copy of the same data would be stored into another snapshot block of the snapshot volume.

As shown in FIG. 6, in response to a matching hash key found in the hash table, the redundancy counter value corresponding to the matching hash key is read (at 602). The storage subsystem next increments (at 604) the redundancy counter, and then determines (at 606) if the incremented redundancy counter value is greater than REDUNDANCY_LIMIT. If not, the process proceeds to task 514 in FIG. 5, in which deduplication is performed to avoid copying another instance of the same data into the snapshot volume; instead, the metadata of the snapshot volume block is updated to point to another metadata that corresponds to the snapshot volume block storing the duplicate data (task 516 in FIG. 5).

If the redundancy counter has a value that is greater than REDUNDANCY_LIMIT, as determined at 606, then the process proceeds to task 518 in FIG. 5, where the address of a free block-in the snapshot volume is obtained for storing the corresponding data from the snapshot volume. Note that this data is a duplicate of a previous data already in the snapshot volume. Next, the process proceeds to task 608 in FIG. 6 to create and initialize the redundancy counter for the hash key corresponding to the new snapshot block that is being populated, and the redundancy counter is inserted (at 610) into the hash table 700 (and initialized with a value 1, for example).

The process then proceeds from task 610 to tasks 520, 522, and 524 of FIG. 5 (described above).

Figure 8:
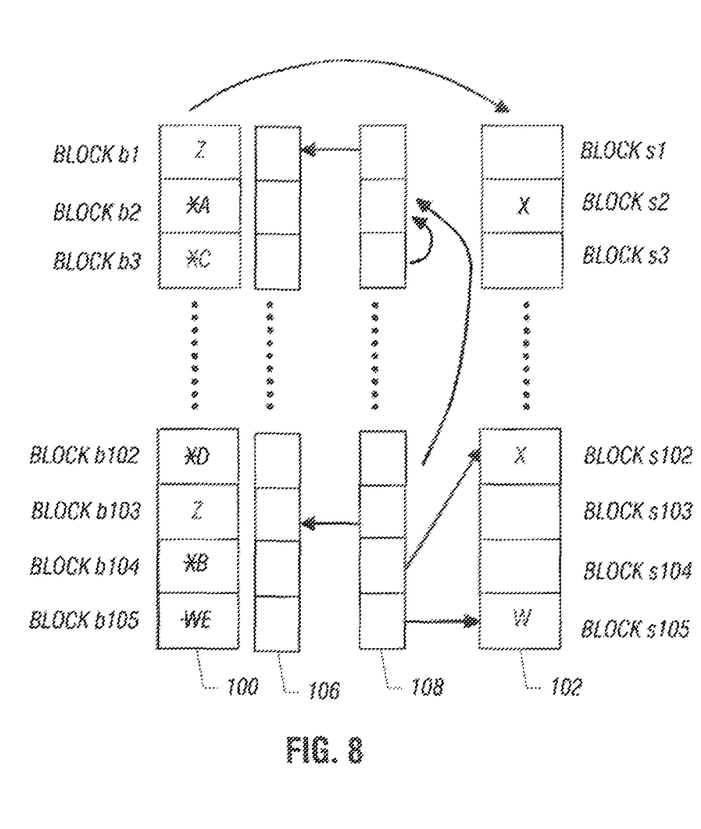
FIG. 8 illustrates storage of duplicate data in a snapshot volume, according to an embodiment.

FIG. 8 shows an example in which multiple instances of data "X" are kept in multiple snapshot blocks of the snapshot volume 102. In the example of FIG. 8, data "X" is stored in snapshot blocks s2 and s102. The metadata of snapshot block s3 points to snapshot block s2, since snapshot block s3 is supposed to also store data "X" but does not to avoid duplication. As discussed above, snapshot block s102 is populated with duplicate data (in this "X") after the redundancy counter for snapshot block s2 reaches REDUNDANCY_LIMIT.

The metadata for snapshot block s102 also contains a pointer to snapshot block s2 to indicate that snapshot block s2 is an alternate location in the snapshot volume for the same data. In the example of FIG. 8, the metadata of snapshot block s104 points to snapshot block s102 to indicate that snapshot block s104 is supposed to store data "X" but does not to avoid duplication.

If, for example, the data "X" in snapshot block s2 were to become corrupted, then the same data "X" can be retrieved from the alternate location in snapshot block s102 such that redundancy is provided.

Figure 9:
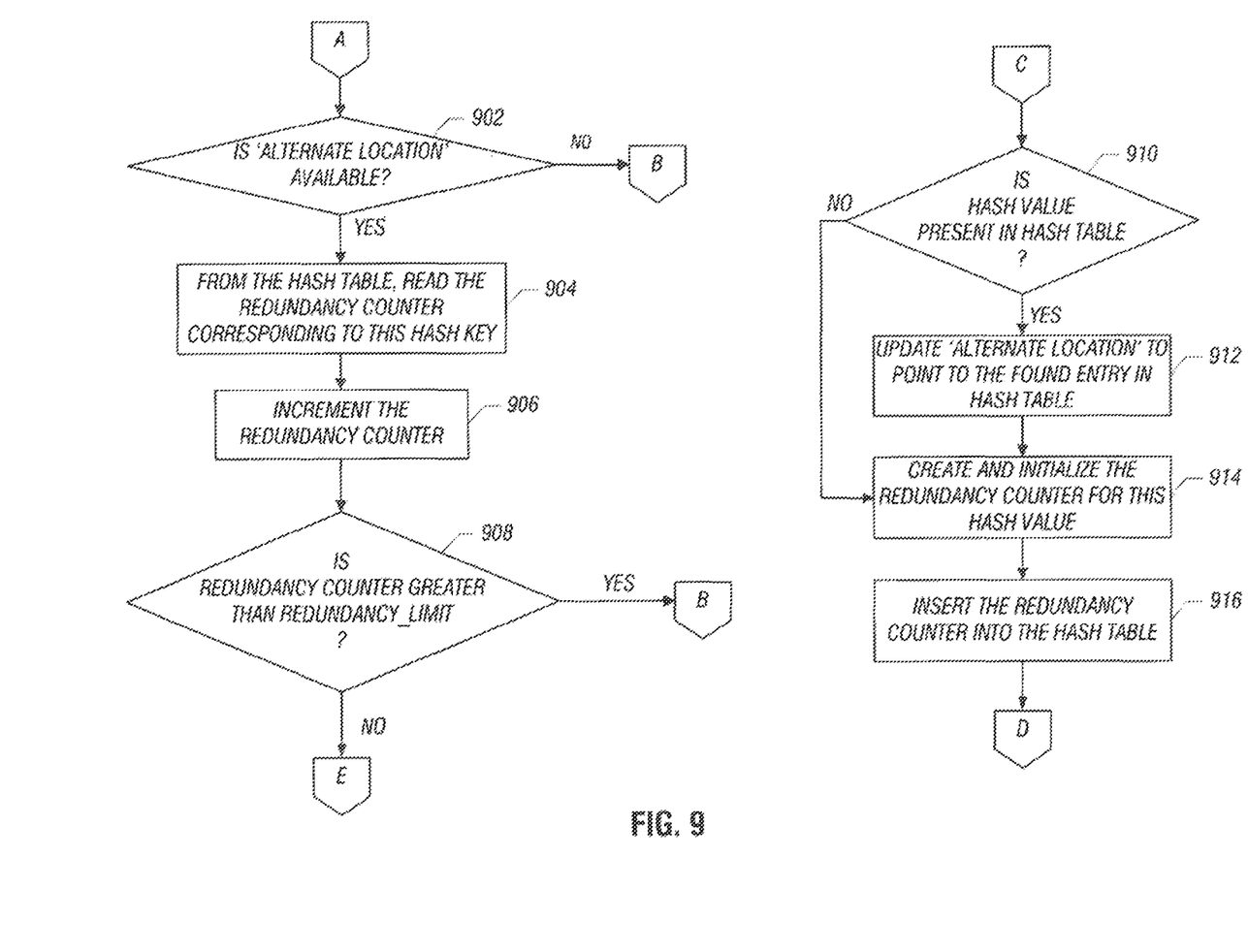
FIG. 9 is a flow diagram of additional tasks to be performed to provide data redundancy in a snapshot volume, according to another embodiment.

If the high-level redundancy technique is implemented instead of the low-level redundancy technique described in FIG. 6, then the additional tasks of FIG. 9 are also implemented in addition to the tasks depicted in FIG. 5. If it is determined (at 512 in FIG. 5) that a matching hash key (matching the hash key of the current data of the source volume that is to be modified by a write request), then the process proceeds from task 512 in FIG. 5 to task 902 of FIG. 9, where the storage subsystem determines if an alternate location is available. If so, then the redundancy counter value corresponding to this hash key is read from the hash table (at 904), and the redundancy counter value is incremented (at 906).

Next, the storage subsystem determines (at 908) whether the incremented redundancy counter value is greater than the threshold REDUNDANCY_LIMIT. If not, then the process proceeds to tasks 514 and 516 (described above). On the other hand, if the redundancy counter value is determined (at 908) to be greater than REDUNDANCY_LIMIT, or alternatively, if it is determined (at 902) that the alternate location is not available for the hash key, then the process proceeds to task 518 in FIG. 5 to obtain the address of a free block of the snapshot volume.

Next, the storage subsystem determines (at 910 in FIG. 9) if the hash key is present in the hash table, and if so, the alternate location is updated (at 912) to point to the entry found in the hash table that contains the matching hash key. Next, the redundancy counter value is created and initialized (at 914) for this hash key.

If no matching hash key is determined (at 910) to be present in the hash table, then the process proceeds directly from task 910 to task 914 to create and initialize the redundancy counter for the hash value.

Next, the created and initialized redundancy counter is inserted (at 916) into the hash table, and the process then proceeds to tasks 520, 522, and 524 of FIG. 5.

A difference between the high-level redundancy technique of FIG. 9 and the low-level redundancy technique of FIG. 6 is that the high-level redundancy technique of FIG. 9 causes another location in the snapshot volume to be created to store duplicate data if the alternate location field of the matching hash key is empty; in other words, if the alternate location field is empty (indicating there is no alternate location), the high-level redundancy technique does not wait for the redundancy counter to first reach REDUNDANCY_LIMIT before creating another copy of data in the snapshot volume.

Figure 10:
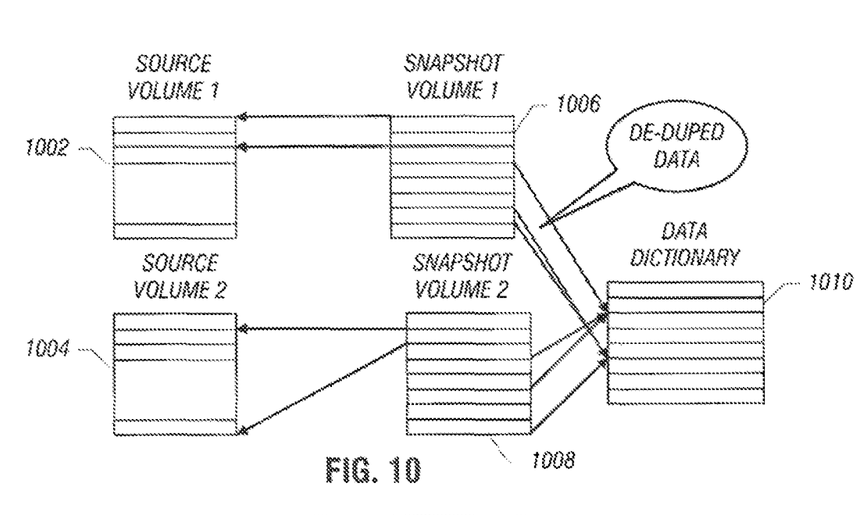
FIG. 10 is a schematic diagram of an arrangement that includes source volumes, snapshot volumes, and a data dictionary to enable deduplication of data stored in the snapshot volumes, according to an embodiment.

FIG. 10 shows an alternative embodiment of the invention, in which a data dictionary 1010 is maintained to store deduplication records that contain data and checksums that represent the data. FIG. 10 also shows a first source volume 1002 and a second source volume 1004. A first snapshot volume 1006 corresponds to the first source volume 1002, while a second snapshot volume 1008 corresponds to the source volume 1004. Arrows 1012 point from data blocks of the first snapshot volume 1006 to the first source volume 1002. Each arrow 1012 indicates that the corresponding data block of the snapshot volume 1006 does not contain any data, but rather, that the corresponding data block of the source volume 1002 contains unmodified data. The remaining data blocks of the snapshot volume 1006 without pointers to the source volume 1002 contain previous versions of data prior to modification of the data in corresponding blocks of the source volume 1002. In similar fashion, arrows 1014 point from data blocks of the second snapshot volume 1008 to corresponding data blocks of the second source volume 1004.

In the embodiment of FIG. 10, the data dictionary 1010 contains multiple deduplication records. Each deduplication record contains actual data, and an address of where the data is located. In addition, the deduplication record also contains a checksum that is computed based on the data in the deduplication record. Over time, the data dictionary 1010 becomes fully populated with deduplication records, such that each snapshot 1006 and 1008 would contain pointers to the corresponding deduplication records of the data dictionary 1010. By keeping just one copy of each unique piece of data in the data dictionary 1010, duplicate copies of the same data in the snapshot volumes 1006 and 1008 are avoided.

Figure 11:
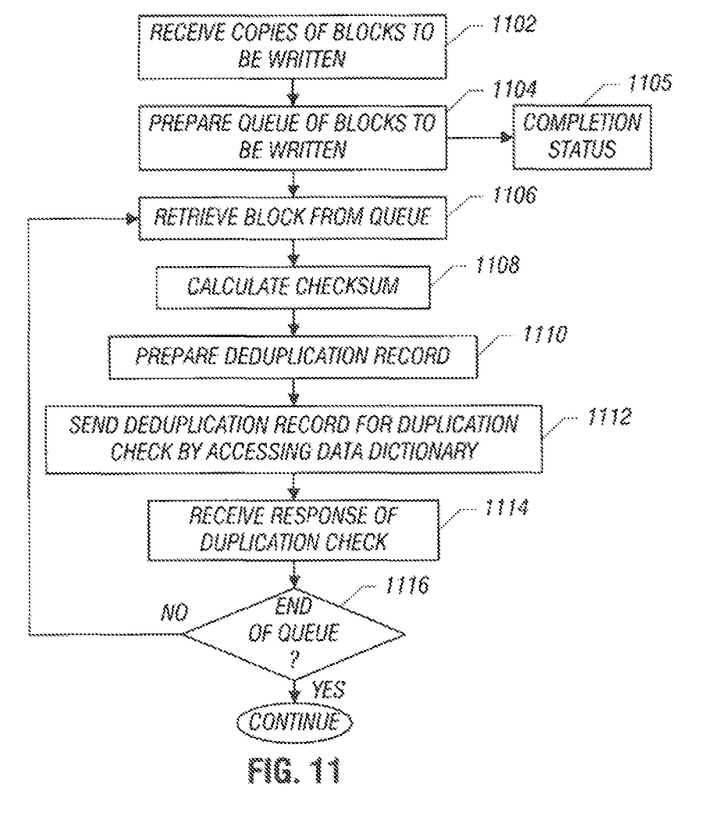
FIG. 11 is a flow diagram of a process for space efficient copying of data from a source volume to a snapshot volume, according to another embodiment.

FIG. 11 shows a process according to this alternative embodiment of deduplicating data to be stored in a snapshot volume. Copies of data blocks from one or more source volumes that are to be written are received (at 1102). Next, a queue of these received blocks to be written is prepared (at 1104). At this point, a completion status can be returned (at 1105) to the one or more requestors that have issued the write requests.

Each block is then iteratively retrieved (at 1106) from the queue. The data block is provided to a checksum calculation engine to calculate (at 1108) the checksum based on the content of the data block, and a deduplication record is prepared (at 1110). The deduplication record that is prepared includes the data block as well as the checksum. The deduplication record is sent (at 1112) to a duplication check process to compare the created deduplication record to the deduplication records of the data dictionary 1010. If the checksum that was sent to the duplication check process matches a checksum in the data dictionary 1010, then that is an indication that the data of this block is already stored in the data dictionary 1010. In this case, the address of the data is returned, and the metadata associated with the corresponding snapshot volume can be updated to point to this address in the data dictionary 1010.

On the other hand, if there is no match between the checksum that was sent to the data dictionary 1010 and the checksums contained in the data dictionary 1010, then the data dictionary 1010 is updated with the new checksum and data block in another deduplication record inserted into the data dictionary 1010. The address where this new data block is stored is returned.

In FIG. 11, a response is received (at 1114) from the duplication check process. The response includes the address of the data that is stored in the data dictionary 1010.

Next, it is checked if the end of the queue containing the blocks to be written has been reached. If not, tasks 1106, 1108, 1110, 1112, and 1114 are repeated.

Figure 12:
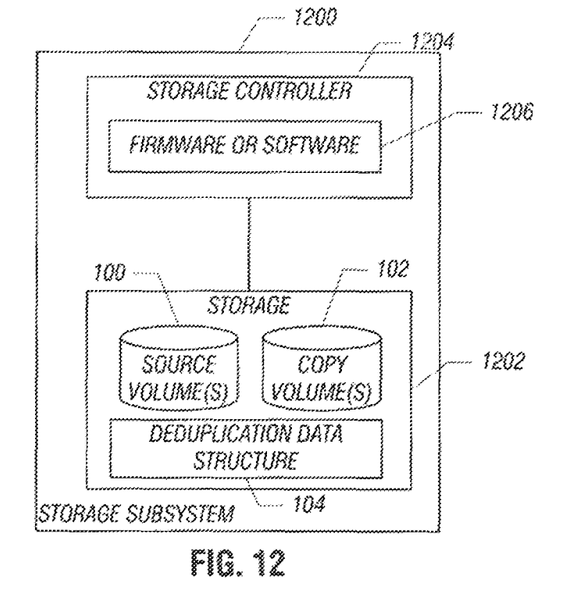
FIG. 12 is a block diagram of a storage subsystem in which some embodiments can be incorporated.

The various tasks described above, including the tasks depicted in FIGS. 5, 6, 9, and 11, as well as other tasks described, can be performed in a storage subsystem, such as storage subsystem 1200 shown in FIG. 12. The storage subsystem 1200 includes physical storage media 1202, which can be implemented with disk-based storage devices or semiconductor storage devices. The physical storage media 1202 stores source volume(s) 100, copy volume(s) 102, and the deduplication data structure 104 (which can be a hash table or a data dictionary, as discussed above).

The storage subsystem 1200 also includes a storage controller 1204 that contains firmware or software 1206 executable in the storage controller 1204. The firmware can be stored in internal storage of the storage controller 1204. Software of the storage controller 1204 can be stored in external storage, such as the physical storage media 1202, and loaded for execution by the storage controller 1204. The storage controller 1204 can be implemented with a microprocessor, microcontroller, application-specific integrated circuit (ASIC), programmable date array, and so forth.

Instructions of the firmware or software described above are loaded for execution by the storage controller 1204. More generally, the storage controller 1204 is referred to as a processor, which includes microprocessors, microcontrollers, processor modules or subsystems (including one or more microprocessors or microcontrollers), or other control or computing devices. As used here, a processor can refer to a single component or to plural components.

Data and instructions (of the firmware or software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom.

It is intended that the appended claims cover such modifications and variations as fall within the true spirit and scope of the invention.

What is claimed is:

1. A method comprising:
   storing a source volume on physical storage media;
   storing a copy volume that contains data that has been modified by writes to the source volume;
   in response to a write to a particular location in the source volume, checking a deduplication data structure to determine whether the copy volume contains data that is the same as data in the particular location;
   in response to determining from the deduplication data structure that the copy volume contains the same data as the data in the particular location, adding a reference to a first location of the copy volume storing the same data instead of repeating storing of the data of the particular location in the copy volume; and
   in response to determining from the deduplication data structure that the copy volume does not contain the same data as the data in the particular location of the source volume, adding an entry to the deduplication data structure, where the added entry contains a signature corresponding to the data of the particular location of the source volume, and where the added entry further includes an address of a location of the copy volume that contains the data of the particular location of the source volume.

2. The method of claim 1, wherein checking the deduplication data structure comprises checking a hash table that contains hash keys corresponding to data blocks of the copy volume that contain data.

3. The method of claim 1, wherein storing the copy volume comprises storing a snapshot volume.

4. The method of claim 1, wherein storing the copy volume comprises storing a clone volume.

5. The method of claim 1, wherein adding the reference to the first location of the copy volume comprises adding a pointer to metadata of a second location of the copy volume that corresponds to the particular location of the source volume, wherein the pointer points to the first location of the copy volume.

6. The method of claim 1, wherein the write to the particular location in the source volume specifies a modification of data in the particular location.

7. A method comprising:
   storing a source volume on physical storage media;
   storing a copy volume that contains data that has been modified by writes to the source volume;
   in response to a write to a particular location in the source volume, checking a deduplication data structure to determine whether the copy volume contains data that is the same as data in the particular location;
   in response to determining from the deduplication data structure that the copy volume contains the same data as the data in the particular location, adding a reference to a first location of the copy volume storing the same data instead of repeating storing of the data of the particular location in the copy volume;
   in response to a second write to a further location in the source volume, checking the deduplication data structure to determine whether the copy volume contains data that is the same as further data in the further location;
   in response to determining from the deduplication data structure that the copy volume contains the same further data as in the further location, checking an indication to determine whether a duplicate copy of the same further data is to be maintained in the copy volume; and
   in response to determining that the duplicate copy of the same further data is to be maintained in the copy volume, creating another entry in the deduplication data structure that is associated with this duplicate copy of the same further data.

8. The method of claim 7, wherein checking the deduplication data structure comprises checking a data dictionary that contains multiple deduplication records, where each deduplication record contains actual data, an address of the actual data, and a checksum associated with the actual data.

9. The method of claim 7, wherein checking the indication comprises checking a redundancy counter, wherein the redundancy counter reaching a predetermined threshold indicates that a duplicate copy of the same further data is to be maintained in the copy volume.

10. A storage subsystem comprising:
    a storage to store a source volume, a copy volume that contains data that has been modified by writes to the source volume, and a deduplication data structure; and
    a storage controller to:
       maintain the deduplication data structure that contains signatures of corresponding data stored in the copy volume;
       in response to a write request to the source volume, access the deduplication data structure to check whether data of the source volume to be modified by the write request is already contained in the copy volume; and
       in response to detecting from the deduplication data structure that the data of the source volume to be modified is not contained in the copy volume, add a new entry to the deduplication data structure, wherein the new entry contains a signature computed based on the data of the source volume to be modified, and wherein the new entry further includes an address of a location of the copy volume that contains the data to be modified by the write request.

11. The storage subsystem of claim 10, wherein the storage controller is to further:
    in response to detecting from the deduplication data structure that the data of the source volume to be modified is already contained in the copy volume, add a pointer to metadata associated with a corresponding data block of the copy volume, wherein the pointer points to another data block of the copy volume that contains the data of the source volume to be modified.

12. The storage subsystem of claim 10, wherein the signatures in the deduplication data structure comprise one of (1) hash keys computed based on corresponding content of the data in the copy volume; and (2) checksums computed based on corresponding content of the data in the copy volume.

13. The storage subsystem of claim 10, wherein the deduplication data structure further contains indications associated with respective signatures to indicate whether duplicate copies of same data are to be maintained in the copy volume.

14. The storage subsystem of claim 13, wherein the indications comprises counter values, wherein each of the counter values is incremented in response to a corresponding copy operation that involves data corresponding to the signature of the counter value, and wherein the counter value reaching a threshold is an indication that a duplicate copy of the data is to be maintained.

15. The storage subsystem of claim 10, wherein the deduplication data structure maps signatures to corresponding addresses of blocks of the copy volume.

16. An article comprising at least one non-transitory computer-readable storage medium containing instructions that when executed cause a storage subsystem to:
- receive a write request to modify data in a block of a source volume; and
- perform a copy operation in response to the write request to update a corresponding block of a copy volume, wherein the copy operation comprises:
  - calculating a signature based on the data in the block of the source volume;
  - comparing the calculated signature with signatures in a deduplication data structure;
  - if there is a match between the calculated signature and one of the signatures in the deduplication data structure, updating metadata of the block of the copy volume to point to another block of the copy volume that contains same data as the data in the block of the source volume to be modified by the write request; and
  - if there is no match between the calculated signature and the signatures of the deduplication data structure, adding a new entry to the deduplication data structure, the new entry containing the calculated signature and an address of a block of the copy volume that contains data of the block of the source volume to be updated by the write request.

* * * * *